(12) United States Patent
Schwarz et al.

(10) Patent No.: US 12,044,183 B2
(45) Date of Patent: *Jul. 23, 2024

(54) GEARED TURBINE ENGINE WITH RELATIVELY LIGHTWEIGHT PROPULSOR MODULE

(71) Applicant: RTX CORPORATION, Farmington, CT (US)

(72) Inventors: Frederick M. Schwarz, Glastonbury, CT (US); Gabriel L. Suciu, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,863

(22) Filed: May 16, 2023

(65) Prior Publication Data

US 2024/0035419 A1 Feb. 1, 2024

Related U.S. Application Data

(63) Continuation of application No. 17/555,606, filed on Dec. 20, 2021, now Pat. No. 11,661,894, which is a
(Continued)

(51) Int. Cl.
*F02C 7/36* (2006.01)
*F02C 3/10* (2006.01)
(Continued)

(52) U.S. Cl.
CPC .............. *F02C 7/36* (2013.01); *F02C 3/10* (2013.01); *F02C 3/107* (2013.01); *F02C 7/20* (2013.01);
(Continued)

(58) Field of Classification Search
CPC ....... F05D 2220/36; F05D 2260/40311; Y02T 50/60; Y10T 29/49321
See application file for complete search history.

(56) References Cited

U.S. PATENT DOCUMENTS 2,258,792 A 10/1941 New
2,936,655 A 5/1960 Peterson et al.
(Continued)

FOREIGN PATENT DOCUMENTS

EP 0791383 A1 8/1997
EP 1142850 A1 10/2001
(Continued)

OTHER PUBLICATIONS

Hess, C. (1998). Pratt & Whitney develops geared turbofan. Flug Revue 43(7). Oct. 1998.
(Continued)

*Primary Examiner* — Binh Q Tran
(74) *Attorney, Agent, or Firm* — Carlson, Gaskey & Olds, P.C.

(57) ABSTRACT

An example gas turbine engine includes a propulsor assembly consisting of a propulsor and a first turbine. An epicyclic gear train defines a gear reduction ratio of greater than 2.3. A weight of the propulsor assembly is less than 40 percent of a total weight of the gas turbine engine, excluding any nacelle. A first spool includes a first shaft that connects a first compressor and the first turbine. The first shaft drives the propulsor through the gear train to drive the propulsor at a lower speed than the first spool. A second spool includes a second shaft connecting a second compressor and a second turbine. A weight of the propulsor is greater than a weight of the first turbine.

30 Claims, 3 Drawing Sheets

Related U.S. Application Data continuation of application No. 16/999,507, filed on Aug. 21, 2020, now Pat. No. 11,236,679, which is a continuation of application No. 16/152,710, filed on Oct. 5, 2018, now Pat. No. 10,753,286, which is a continuation of application No. 14/432,377, filed as application No. PCT/US2013/025276 on Feb. 8, 2013, now Pat. No. 10,100,745.

(60) Provisional application No. 61/710,808, filed on Oct. 8, 2012.

(51) Int. Cl.
| | |
|---|---|
| *F02C 3/107* | (2006.01) |
| *F02C 3/113* | (2006.01) |
| *F02C 3/20* | (2006.01) |
| *F02C 6/20* | (2006.01) |
| *F02C 7/20* | (2006.01) |
| *F02C 7/32* | (2006.01) |

(52) U.S. Cl.
CPC ............... *F02C 7/32* (2013.01); *F02C 3/113* (2013.01); *F02C 3/20* (2013.01); *F02C 6/20* (2013.01); *F02C 6/206* (2013.01); *F05D 2220/36* (2013.01); *F05D 2260/40311* (2013.01); *Y02T 50/60* (2013.01); *Y10T 29/49321* (2015.01)

(56) References Cited

U.S. PATENT DOCUMENTS

| | | | |
|---|---|---|---|
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,664,612 | A | 5/1972 | Skidmore et al. |
| 3,747,343 | A | 7/1973 | Rosen |
| 3,754,484 | A | 8/1973 | Roberts |
| 3,765,623 | A | 10/1973 | Donelson et al. |
| 3,820,719 | A | 6/1974 | Clark et al. |
| 3,843,277 | A | 10/1974 | Ehrich |
| 3,892,358 | A | 7/1975 | Gisslen |
| 3,932,058 | A | 1/1976 | Harner et al. |
| 3,935,558 | A | 1/1976 | Miller et al. |
| 3,988,889 | A | 11/1976 | Chamay et al. |
| 4,130,872 | A | 12/1978 | Haloff |
| 4,220,171 | A | 9/1980 | Ruehr et al. |
| 4,240,250 | A | 12/1980 | Harris |
| 4,284,174 | A | 8/1981 | Salvana et al. |
| 4,289,360 | A | 9/1981 | Zirin |
| 4,478,551 | A | 10/1984 | Honeycutt, Jr. et al. |
| 4,649,114 | A | 3/1987 | Miltenburger et al. |
| 4,696,156 | A | 9/1987 | Burr et al. |
| 4,722,357 | A | 2/1988 | Wynosky |
| 4,798,547 | A | 1/1989 | Gearhart |
| 4,827,712 | A | 5/1989 | Coplin |
| 4,969,325 | A * | 11/1990 | Adamson ............... F02C 3/067 416/129 |
| 4,979,362 | A | 12/1990 | Vershure, Jr. |
| 4,982,914 | A | 1/1991 | Eickmann |
| 5,058,617 | A | 10/1991 | Stockman et al. |
| 5,102,379 | A | 4/1992 | Pagluica et al. |
| 5,141,400 | A | 8/1992 | Murphy et al. |
| 5,317,877 | A | 6/1994 | Stuart |
| 5,344,280 | A | 9/1994 | Langenbrunner et al. |
| 5,361,580 | A | 11/1994 | Ciokajlo et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,591,057 | A | 1/1997 | Dai et al. |
| 5,634,767 | A | 6/1997 | Dawson |
| 5,677,060 | A | 10/1997 | Terentieva et al. |
| 5,778,659 | A | 7/1998 | Duesler et al. |
| 5,857,836 | A | 1/1999 | Stickler et al. |
| 5,860,275 | A | 1/1999 | Newton et al. |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,039,542 | A | 3/2000 | Schilling et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,387,456 | B1 | 5/2002 | Eaton, Jr. et al. |
| 6,517,341 | B1 | 2/2003 | Brun et al. |
| 6,607,165 | B1 | 8/2003 | Manteiga et al. |
| 6,709,492 | B1 | 3/2004 | Spadaccini et al. |
| 6,814,541 | B2 | 11/2004 | Evans et al. |
| 6,883,303 | B1 | 4/2005 | Seda |
| 7,021,042 | B2 | 4/2006 | Law |
| 7,219,490 | B2 | 5/2007 | Dev |
| 7,328,580 | B2 | 2/2008 | Lee et al. |
| 7,364,402 | B2 | 4/2008 | Brault et al. |
| 7,374,403 | B2 | 5/2008 | Decker et al. |
| 7,591,754 | B2 | 9/2009 | Duong et al. |
| 7,632,064 | B2 | 12/2009 | Somanath et al. |
| 7,662,059 | B2 | 2/2010 | McCune |
| 7,806,651 | B2 | 10/2010 | Kennepohl et al. |
| 7,824,305 | B2 | 11/2010 | Duong et al. |
| 7,828,521 | B2 | 11/2010 | Bart |
| 7,828,682 | B2 | 11/2010 | Smook |
| 7,926,260 | B2 | 4/2011 | Sheridan et al. |
| 7,972,109 | B2 | 7/2011 | Crall et al. |
| 7,997,868 | B1 | 8/2011 | Liang |
| 8,205,432 | B2 | 6/2012 | Sheridan |
| 8,246,292 | B1 | 8/2012 | Morin et al. |
| 8,596,036 | B2 | 12/2013 | Hyde et al. |
| 8,720,205 | B2 | 5/2014 | Lugg |
| 8,857,191 | B2 | 10/2014 | Hyde et al. |
| 9,957,055 | B2 | 5/2018 | Marrinan et al. |
| 10,100,745 | B2 * | 10/2018 | Schwarz ................ F02C 3/107 |
| 10,161,773 | B2 | 12/2018 | Degaribody |
| 10,358,924 | B2 | 7/2019 | Gallagher et al. |
| 10,371,047 | B2 | 8/2019 | Schwarz |
| 10,371,061 | B2 | 8/2019 | Adams et al. |
| 10,753,286 | B2 * | 8/2020 | Schwarz ................ F02C 7/32 |
| 10,760,530 | B2 * | 9/2020 | Stretton ................ F02C 3/04 |
| 10,814,990 | B2 * | 10/2020 | Vassberg ............... B64D 33/04 |
| 11,053,947 | B2 * | 7/2021 | Stretton ................ F02K 3/068 |
| 11,236,679 | B2 * | 2/2022 | Schwarz ................ F02C 7/36 |
| 11,661,894 | B2 * | 5/2023 | Schwarz ................ F02C 7/36 29/889.21 |
| 2006/0228206 | A1 | 10/2006 | Decker et al. |
| 2008/0003096 | A1 | 1/2008 | Kohli et al. |
| 2008/0116009 | A1 | 5/2008 | Sheridan et al. |
| 2008/0184694 | A1 | 8/2008 | Guimbard et al. |
| 2008/0317588 | A1 | 12/2008 | Grabowski et al. |
| 2009/0056343 | A1 | 3/2009 | Suciu et al. |
| 2009/0269197 | A1 | 10/2009 | Evans |
| 2009/0304518 | A1 | 12/2009 | Kodama et al. |
| 2009/0314881 | A1 | 12/2009 | Suciu et al. |
| 2010/0083669 | A1 * | 4/2010 | Foster ................ F02C 7/36 60/802 |
| 2010/0105516 | A1 | 4/2010 | Sheridan et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0159797 | A1 | 6/2011 | Beltman et al. |
| 2011/0293423 | A1 | 12/2011 | Bunker et al. |
| 2012/0023899 | A1 | 2/2012 | Yasuda |
| 2012/0124964 | A1 | 5/2012 | Hasel et al. |
| 2012/0198815 | A1 | 8/2012 | Suciu et al. |
| 2014/0363276 | A1 * | 12/2014 | Vetters ................ F02K 3/075 415/124.2 |

(56) References Cited

U.S. PATENT DOCUMENTS

| | | | | |
|---|---|---|---|---|
| 2015/0125259 A1* | 5/2015 | Suciu | ............. | F01D 7/00 415/1 |
| 2017/0190446 A1 | 7/2017 | Williams, Sr. | | |

FOREIGN PATENT DOCUMENTS

| | | | |
|---|---|---|---|
| GB | 1516041 | A | 6/1978 |
| GB | 2041090 | A | 9/1980 |
| GB | 2426792 | A | 12/2006 |
| JP | S53143817 | A | 12/1978 |
| JP | H07217499 | A | 8/1995 |
| WO | 2007038674 | A1 | 4/2007 |
| WO | 2014055113 | A1 | 4/2014 |

OTHER PUBLICATIONS

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH Co. KGaA. pp. 1-24.

Howard, D.F. (1976). QCSEE preliminary under the wing flight propulsion system analysis report. Nasa CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

International Preliminary Report on Patentability for International Application No. PCT/US2013/025276, dated on Apr. 16, 2015, 11 pages.

International Search Report for PCT Application No. PCT/US2013/025276 mailed Nov. 7, 2013.

Ivchenko-Progress AI-727M. Jane's Aero-engines, Aero-engines—Turbofan. Nov. 27, 2011.

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148(8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press. p. 11.

Knip, Jr., G. (1987). Analysis of an advanced technology subsonic turbofan incorporating revolutionary materials. NASA Technical Memorandum. May 1987. pp. 1-23.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Krantz, T.L. (1990). Experimental and analytical evaluation of efficiency of helicopter planetary stage. NASA Technical Paper. Nov. 1990. pp. 1-19.

Krenkel, W., Naslain, R., and Schneider, H. Eds. (2001). High temperature ceramic matrix composites pp. 224-229. Weinheim, DE: Wiley-VCH Verlag GmbH.

Kurzke, J. (2001). GasTurb 9: A program to calculate design and off-design performance of gas turbines. Retrieved from: https://www.scribd.com/document/92384867/GasTurb9Manual.

Kurzke, J. (2008). Preliminary Design, Aero-engine design: From state of the art turbofans towards innovative architectures. pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Kurzke, J. (2012). GasTurb 12: Design and off-design performance of gas turbines. Retrieved from: https://www.scribd.com/document/153900429/GasTurb-12.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Lau, K., Gu, C., and Hui, D. (2005). A critical review on nanotube and nanotube/nanoclay related polymer composite materials. Composites: Part B 37(2006) 425-436.

(56) References Cited

OTHER PUBLICATIONS

Leckie, F.A. and Dal Bello, D.J. (2009). Strength and stiffness of engineering systems. Mechanical Engineering Series. Springer. pp. 1-10, 48-51.

Leckie F.A., et al., "Strength and Stiffness of Engineering Systems," Mechanical Engineering Series, Springer, 2009, pp. 1-3.

2003 NASA seal/secondary air system workshop. (2003). NASA/CP-2004-212963/vol. 1. Sep. 1, 2004. pp. 1-408.

About Gas Turb. Retrieved Jun. 26, 2018 from: http://gasturb.de/about-gasturb.html.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

Aerospace Information Report. (2008). Advanced ducted propulsor in-flight thrust determination. SAE International AIR5450. Aug. 2008. p. 1-392.

Agarwal, B.D. and Broutman, L.J. (1990). Analysis and performance of fiber composites, 2nd Edition. John Wiley & Sons, Inc. New York: New York. pp. 1-11, 13-23, 26-33, 50-51, 56-58, 60-61, 64-71, 87-89, 324-329, 436-437.

AGMA Standard (1997). Design and selection of components for enclosed gear drives. lexandria, VA: American Gear Manufacturers Association. pp. 1-48.

AGMA Standard (1999). Flexible couplings- Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp. 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Burgel R., et al., "Development of a New Alloy for Directional Solidification of Large Industrial Gas Turbine Blades," Superalloys 2004, pp. 25-34.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B For the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

(56) References Cited

OTHER PUBLICATIONS

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Pat. No. 8,313,280, Executed Oct. 21, 2016, pp. 1-88.

Declaration of Dr. Magdy Attia, In re U.S. Pat. No. 8,517,668, Executed Dec. 8, 2016, pp. 1-81.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. vol 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443. Apr. 1995. pp. 1-187.

Litt, U.S. (2018). Sixth NASA Glenn Research Center propulsion control and diagnostics (PCD) workshop. NASA/CP-2018-219891. Apr. 1, 2018. pp. 1-400.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, U.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp. 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

(56) References Cited

OTHER PUBLICATIONS

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

Tummers, B. (2006). DataThief III. Retreived from: https://datathief.org/DatathiefManual.pdf pp. 1-52.

Turbomeca Aubisque. Jane's Aero-engines, Aero-engines—Turbofan. Nov. 2, 2009.

Turner, M. G., Norris, A., and Veres, J.P. (2004). High-fidelity three-dimensional simulation of the GE90. NASA/TM-2004-212981. pp. 1-18.

Type Certificate Data Sheet No. E6NE. Department of Transportation Federal Aviation Administration. Jun. 7, 2002. pp. 1-10.

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.

U.S. Department of Transportation: Federal Aviation Administration Advisory Circular. Standard operating procedures for flight deck crewmembers, Dated: Feb. 27, 2003, p. 1-6 and Appendices.

U.S. Department of Transportation: Federal Aviation Administration Type Certificate Data Sheet No. E6WE. Dated: May 9, 2000. p. 1-9.

Vasudevan, A.K. and Petrovic, J.J. (1992). A comparative overview of molybedenum disilicide composites. Materials Science and Engineering, A155, 1992. pp. 1-17.

Waters, M.H. and Schairer, E.T. (1977). Analysis of turbofan propulsion system weight and dimensions. NASA Technical Memorandum. Jan. 1977. pp. 1-65.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Rolls-Royce M45H. Jane's Aero-engines, Aero-engines—Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley Sons, Inc. pp. 722-726 and 764-771.

(56) References Cited

OTHER PUBLICATIONS

Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP13845886.4, dated Sep. 25, 2015, 9 pages.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Third Party Observations for EP Application No. EP13845886.4, dated Nov. 9, 2018 by Rolls-Royce, 3 pages.
Third Party Observations for EP Application No. EP13845886.4, mailed Oct. 5, 2018 by Rolls-Royce, 8 pages.

Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Declaration of John Eaton, Ph.D. In re U.S. Pat. No. 8,689,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite- element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Search Report for Application No. EP20162485.5, dated Jun. 16, 2020, 11 pages.
Faghri, A. (1995). Heat pipe and science technology. Washington, D.C.: Taylor Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.

(56) References Cited

OTHER PUBLICATIONS

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.

\* cited by examiner

|  | TOTAL ENGINE WEIGHT (LBS) $ENG_{TOT}$ | FAN MODULE WEIGHT (LBS) $F_W$ | TURBINE MODULE WEIGHT (LBS) $T_W$ | PROPULSOR ASSEMBLY WEIGHT (LBS) $P_{TOT}=F_W+T_W$ | $P_{TOT}/ENG_{TOT}$ |
|---|---|---|---|---|---|
| AN EXAMPLE ENGINE | 6162 | 1261 | 577 | 1838 | 29.8% |
| ANOTHER EXAMPLE ENGINE | 4837 | 1082 | 522 | 1604 | 33.2% |
| YET ANOTHER EXAMPLE ENGINE | 3637 | 712 | 321 | 1033 | 28.4% |

FIG.3

GEARED TURBINE ENGINE WITH RELATIVELY LIGHTWEIGHT PROPULSOR MODULE

CROSS-REFERENCE TO RELATED APPLICATIONS

This application is a continuation of U.S. patent application Ser. No. 17/555,606 filed Dec. 20, 2021, which is a continuation of U.S. patent application Ser. No. 16/999,507 filed Aug. 21, 2020, which is a continuation of U.S. patent application Ser. No. 16/152,710 filed Oct. 5, 2018, which is a continuation of U.S. patent application Ser. No. 14/432,377 filed Mar. 30, 2015, now U.S. Pat. No. 10,100,745 granted Oct. 16, 2018, which is a national stage entry of International Application No. PCT/US2013/025276 filed Feb. 8, 2013, and which claims priority to U.S. Provisional Application No. 61/710,808 filed on 8 Oct. 2012, and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer, and propulsive efficiencies.

SUMMARY

A gas turbine engine according to an exemplary aspect of the present disclosure includes, among other things, a propulsor assembly including at least a fan module and a fan drive turbine module; a gas generator assembly including at least a compressor section, a combustor in fluid communication with the compressor section; and a turbine in fluid communication with the combustor; and a geared architecture driven by the fan drive turbine module for rotating a fan of the fan module. A weight of the fan module and the fan drive turbine module is less than about 40% of a total weight of a gas turbine engine.

In a further non-limiting embodiment of the foregoing gas turbine engine, the fan module comprises no more than 26 fan blades.

In a further non-limiting embodiment of either of the foregoing gas turbine engines, the fan module comprises more than 26 shrouded fan blades.

In a further non-limiting embodiment of any of the foregoing gas turbine engines, the fan drive turbine module comprises a rotor that is configured to rotate more than 2.6 times for every single rotation of the fan.

In a further non-limiting embodiment of any of the foregoing gas turbine engines, the fan drive turbine module comprises directionally solidified blades.

In a further non-limiting embodiment of any of the foregoing gas turbine engines, the fan drive turbine module comprises fewer than six stages.

In a further non-limiting embodiment of any of the foregoing gas turbine engines, the weight of the fan module and the fan drive turbine module is from 28 to 34 percent the total weight of the gas turbine engine.

A gas turbine engine according to another exemplary aspect of the present disclosure includes, among other things, a propulsor assembly of a gas turbine engine, the propulsor assembly including at least a fan module and a fan drive turbine module, the propulsor assembly is less than about 40% of a total weight of a gas turbine engine.

In a further non-limiting embodiment of the foregoing gas turbine engines, the fan module comprises no more than 26 fan blades.

In a further non-limiting embodiment of either of the foregoing gas turbine engines, the fan module comprises more than 26 shrouded fan blades.

In a further non-limiting embodiment of any of the foregoing gas turbine engines, the fan drive turbine module comprises a rotor that is configured to rotate 2.6 times for every single rotation of the fan.

In a further non-limiting embodiment of any of the foregoing gas turbine engines, the fan drive turbine module comprises directionally solidified blades.

In a further non-limiting embodiment of any of the foregoing gas turbine engines, the fan drive turbine module comprises fewer than six stages.

In a further non-limiting embodiment of any of the foregoing gas turbine engines, the propulsor assembly is from 28 to 34 percent the total weight of the gas turbine engine.

A method of distributing weight between a propulsor assembly and a gas generator assembly of a gas turbine engine according to another exemplary aspect of the present disclosure includes, among other things, providing a propulsor assembly that have a first weight, the propulsor assembly including a fan module and a turbine module; and configuring the propulsor assembly for installation within a gas turbine engine having a second weight when the propulsor assembly is installed, wherein the first weight is less than 40 percent of the second weight.

In a further non-limiting embodiment of the foregoing method of distributing weight, the fan module comprises no more than 26 fan blades.

In a further non-limiting embodiment of either of the foregoing methods of distributing weight, the fan module comprises more than 26 shrouded fan blades.

In a further non-limiting embodiment of any of the foregoing methods of distributing weight, the fan drive turbine module comprises a rotor that is configured to rotate 2.6 times for every single rotation of the fan.

In a further non-limiting embodiment of any of the foregoing methods of distributing weight, the propulsor assembly is from 28 and 34 percent a total weight of a gas turbine engine.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 3 shows a comparative table of features of the gas turbine engine of FIG. 2 and other gas turbine engines.

DETAILED DESCRIPTION

Figure 1:
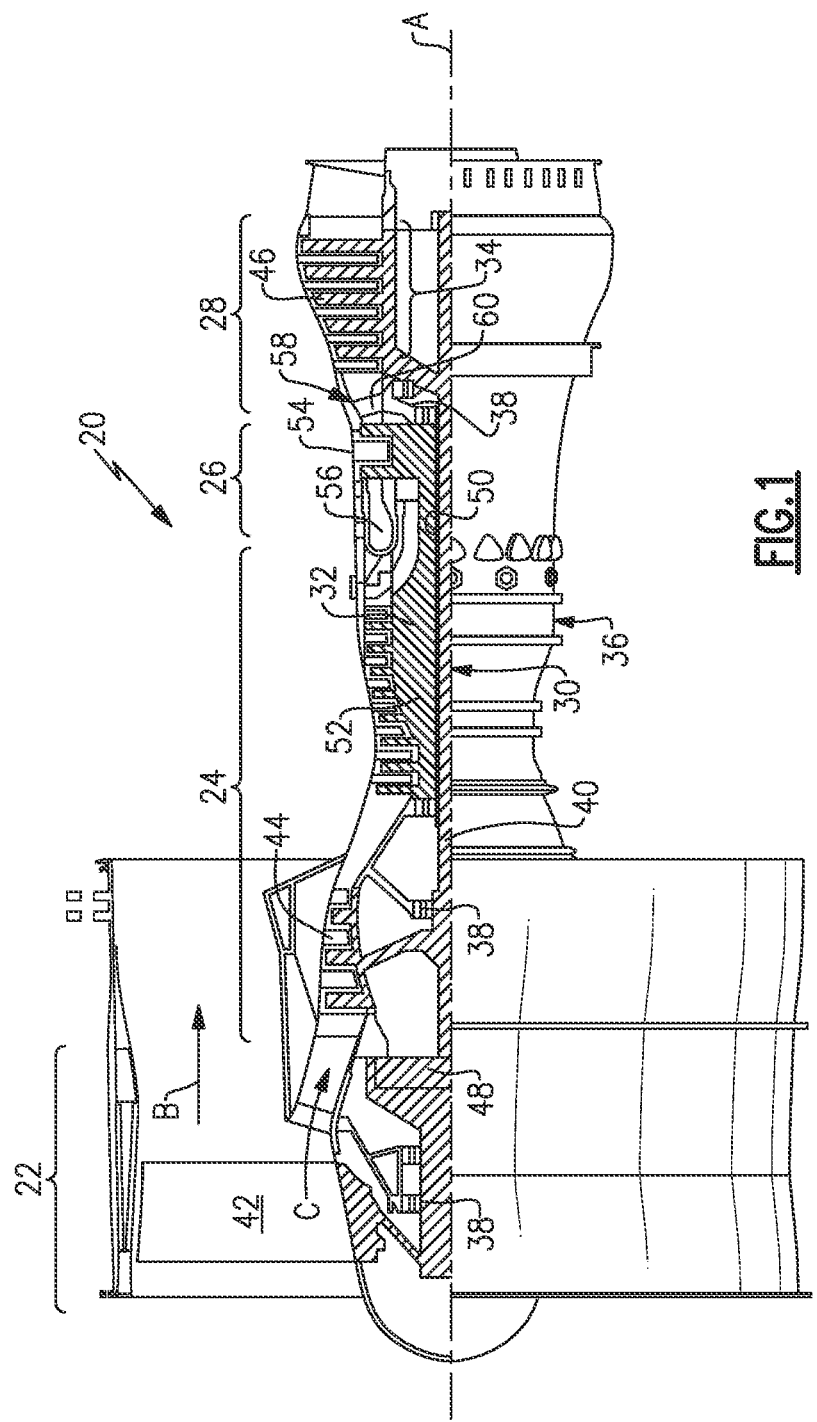
FIG. 1 shows a section view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a gas turbine gas turbine engine, it should be understood that the concepts described herein are not limited to use with gas turbines as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as bucket cruise Thrust Specific Fuel Consumption (TSFC)—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram° R)/(518.7° R)]^0.5. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The example gas turbine engine 20 includes weight reduction features facilitating improved efficiency. Example weight reduction features provide a propulsor assembly in the engine 20 that, in total, is less than about 40% of the total engine weight. Engines having a propulsor assembly that is less than about 40% of the total engine weight have been found to have a more efficient and targeted weight distribution than other engines.

Engines having weight distributed in this way have relatively lighter front ends, which may be advantageous as the engine 20 is cantilevered forward of the wing. For example, a pylon structure (not shown) securing the engine 20 to a wing must typically hold the engine 20 under very high g loads and even crash loads. The greater the weight of the fan section, the greater the weight of the pylon structure. The engine 20 and pylon structure are held by the wing where both the weight of the engine 20 and the moment arm of the fan section 22 and the low pressure turbine 46 and the pylon structure must be accommodated.

Figure 2:
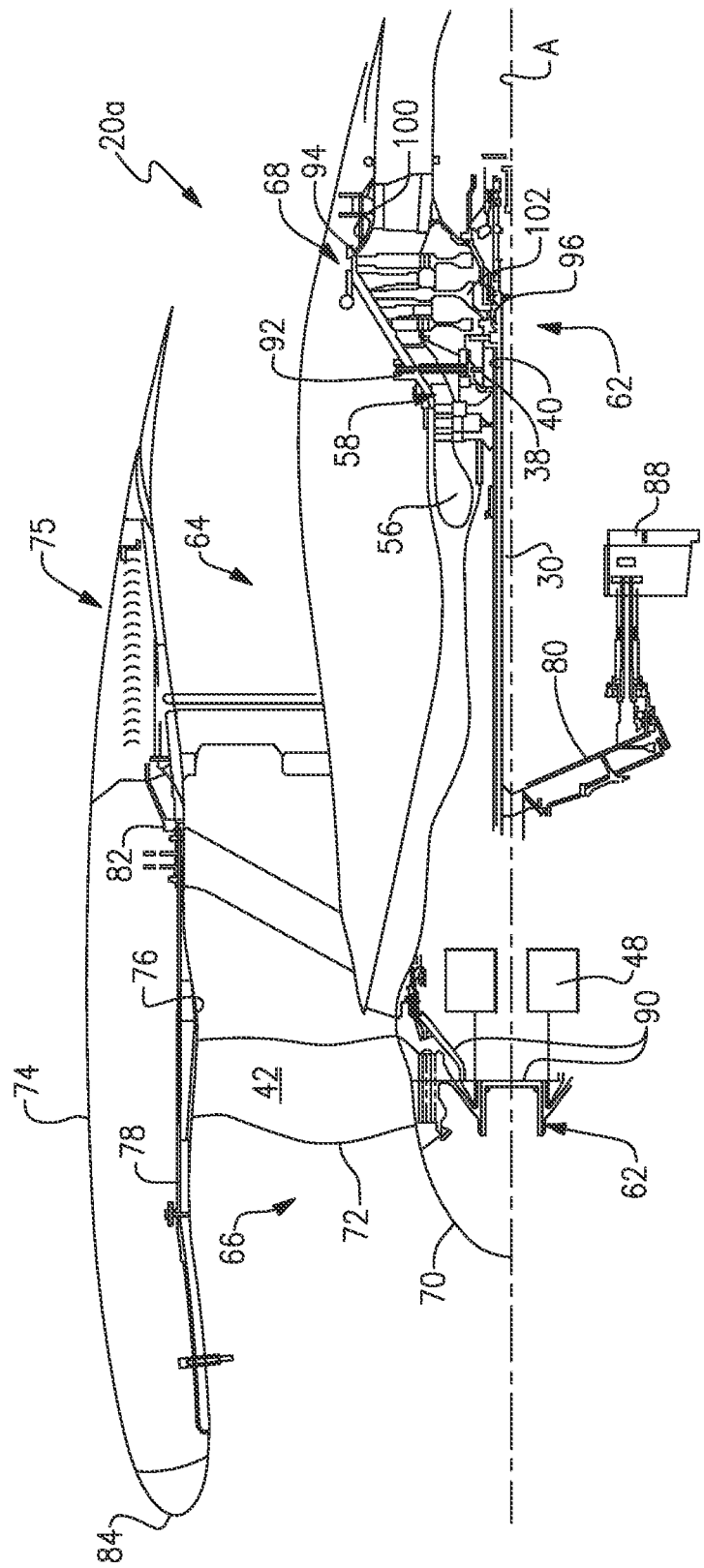
FIG. 2 shows a section view of a portion of an example embodiment of the gas turbine engine of FIG. 1.

Referring to FIGS. 2 and 3 with continued reference to FIG. 1, an example gas turbine engine 20a includes a propulsor assembly 62 and a gas generator assembly 64. In this example, the propulsor assembly 62 includes a fan module 66 and a turbine module 68. Generally, the propulsor assembly 62 includes structures associated with producing thrust. The gas generator assembly 64 includes the remaining portions of the engine 20a. In this example, the turbine module 68 is a low pressure, or fan drive, turbine module.

As known, modular construction of gas turbine engines has developed to facilitate assembly, transportation, and repair. A person having skill in this art in the benefit of this disclosure would understand the general boundaries of the propulsor assembly 62 and gas generator assembly 64 within a gas turbine engine 20a, as well as the modules therein.

The example fan module 66 includes the fan 42. The fan 42 includes a hub 70 and an array of blades 72 extending radially from the hub 70. The hub 70 and blades 72 fit within an annular fan case 76.

A nacelle 74 circumscribes the fan module 66 and other portions of the engine 20a. In this example, a front flange 78 and a rear flange 82 are used to secure the fan module 66 to the nacelle 74 and the gas turbine engine 20a. The terms front and rear are with reference to a general direction of flow through the engine 20a.

In this example, the front flange 78 directly secures the case 76 of the fan module 66 to the nacelle 74 at a position axially forward the blades 72. Components axially forward and radially outward of the flange 78 are considered portions of the nacelle 74.

In this example, the rear flange 82 directly secures the case 76 of the fan module 66 to the nacelle 74 at a position axially rearward the blades 72. Components axially rearward and radially outboard of the rear flange 82 are considered portions of the nacelle 74. The rear flange 82 may attach at a position that is rearward of a fan exit guide vane 86.

In this example, the nacelle 74 is a considered a separate structure from the engine 20a, a thrust reverser system 75, and flanges 78 and 82.

The geared architecture 48 of the gas turbine engine 20a has a bearing compartment front wall 90. The example fan module 66 includes the bearing compartment front wall 90, but does not include other portions of the geared architecture 48. The bearing compartment front wall 90 supports the fan 42. The bearing compartment front wall 90 is typically shipped together with the remaining portions of the fan module 66.

The fan module 66 has a weight $F_W$. The nacelle 74, the front flange 78, and the rear flange 78 are, in this example, excluded when determining the overall weight of the fan module 66.

The turbine module 68 is secured within the engine 20a by at least a front flange 92, a rear flange 94, and hub bolts 96. The front flange 92 secures the turbine module 68 to the mid-turbine frame 58. The rear flange 94 secures the turbine module 68 to a turbine exhaust case 100. The hub bolts 96 secure the turbine module 68 to the inner shaft 40 of the low speed spool 30.

The turbine module 68 has a weight $T_W$. The mid-turbine frame 58, the exhaust case 100, and the shaft 40 are, in this example, excluded when determining the overall weight of the fan module 66.

The propulsor assembly 62 has a total weight $P_{TOT}$, which is the sum of the weight $F_W$ of the fan module 66 and the weight $T_W$ of the turbine module 68. That is, $P_{TOT}=F_W+T_W$.

In addition to the propulsor assembly 62, the example engine 20a includes a gas generator assembly 64. The structures of the gas generator assembly 64 are generally considered to be the portions of the engine 20a that are not part of the propulsor assembly 62. The gas generator assembly 64 has a total weight $G_{TOT}$.

The gas generator assembly 64 thus includes the low pressure compressor 44, the high pressure compressor 52, a diffuser case, and the high pressure turbine 54. The gas generator assembly 64 further includes the mid turbine frame 58, all bearing systems 38, the inner shaft 40, a tower shaft 80, external components, such as an accessory gearbox 88, control and wire harnesses, and pressure sensing devices and tubes, and all other externals and fluids.

In another geared gas turbine configuration utilizing three spools, the gas generator assembly 64 may additionally include an intermediate pressure compressor and intermediate pressure turbine.

As can be appreciated, the engine 20a has a total weight $Eng_{TOT}$, which can be determined by adding the weight $P_{TOT}$ of the propulsor assembly 62 and the weight $G_{TOT}$ of the gas generator assembly 64. That is, $Eng_{TOT}=P_{TOT}+G_{TOT}$.

Components of the example propulsor assembly 62 include features facilitating reduced the weight $P_{TOT}$ of the propulsor assembly 62. In this example, the weight $P_{TOT}$ is less than about 40% of the total engine weight $Eng_{TOT}$.

Example weight reducing features of the fan module 66 can include constructing the blades 72 of one or more relatively lightweight materials, such as aluminum, hollow aluminum, hollow titanium, composite materials and plastic, or some combination of these. The number of blades 72 in the engine 20a is less than about 26, which also contributes to reducing weight.

In some examples, the fan module 66 may include blades 72 of a shrouded fan blade configuration having more than 26 blades. The blades 72 can include a lightweight fan blade leading edge protection features including, but not limited to, a titanium shroud, nickel shroud, and/or a metallic coating in a leading edge region.

The fan module 66 may further include and be enabled by using a lightweight fan blade containment system. A disclosed example lightweight fan blade containment system could include one of or a combination of aluminum, and/or an organic matrix composite material.

The weight of the fan module 66 can be influenced by how many blades 72 are used (few blades 72 may be heavier and more difficult to contain), whether the blades 72 are solid or hollow; whether the blades 72 have a number greater than 26 and therefore require a shroud between blades 72. The fan blades 72 can be titanium solid (inexpensive, heavy); titanium hollow (expensive, light); composite with a metal leading edge (light, expensive); solid aluminum (light, inexpensive) or hollow aluminum (ultra-light, inexpensive). The fan case can be aluminum with a Kevlar containment system (this is cheap and heavy) or can be a wound composite case (more expensive, light in weight).

Additional features facilitating use of a relatively lightweight propulsor assembly 62 within the engine 20a include tapered roller bearings that reduce engine length. A canted fan exit guide vane further provides an efficient load connection between the fan rotor support and an outer barrel of the fan section 22.

Example weight reducing features of the turbine module 68 include a relatively high speed low pressure turbine rotor 102 configured to operate at a rotational speed that is at least 2.6 times the speed of the fan 42. That is, the rotor 102 is configured to rotate 2.6 times for every single rotation of the fan 42.

In this example, the low pressure turbine 46 is a fan drive turbine. Similarly, the turbine module 68 is a fan drive turbine module. Other geared gas turbine configurations that utilize three turbines may also include a fan drive turbine operating within similar speed ratio ranges.

In this example, the low pressure turbine 46 includes fewer than about six stages. The number of stages of the low pressure turbine 46 is an example of many elements that facilitate maintaining the disclosed weight ratio of the propulsor assembly 62 relative to the overall engine weight. Portions of the propulsor assembly, such as the low pressure turbine 46, may include directionally solidified blades.

The low pressure turbine could also be three stages or four. The four stage version may be more efficient, but heavier, than the three stage version. The bearing compartment 38 supporting the low pressure turbine 46 shaft can be at the far end of the shaft 40 (which may be heavier and less expensive) or between the high pressure turbine 24 and low pressure turbine 46 (which may be lighter, more expensive, hotter and a challenge to design and repair).

In the disclosed example listed in FIG. 3, the overall engine weight $Eng_{TOT}$ (which does not include the nacelle structure and mounts) is about 6162 lbs (2795 kg) with a propulsor assembly weight $P_{TOT}$ of about 1838 lbs (834 kg). The propulsor assembly weight $P_{TOT}$ is about 29.8 percent of the total geared gas turbine weight $Eng_{TOT}$. In another disclosed example, the total engine weight $Eng_{TOT}$ is about 4837 lbs (2194 kg) and the propulsor module weight $P_{TOT}$ is about 1604 lbs (728 kg) or about 33.2 percent of the total engine weight $Eng_{TOT}$. In a further disclosed example, the total engine weight $Eng_{TOT}$ is about 3637 lbs (1650 kg) and the propulsor module weight $P_{TOT}$ is about 1033 (469 kg) or about 28.4 percent of the total engine weight $Eng_{TOT}$.

Although an example embodiment has been disclosed, a worker of ordinary skill in this art would recognize that certain modifications would come within the scope of this disclosure. For that reason, the following claims should be studied to determine the scope and content of this disclosure.

We claim:

1. A gas turbine engine comprising:
a propulsor assembly consisting of a propulsor and a first turbine, the propulsor including a hub and an array of no more than 26 blades extending from the hub;
an epicyclic gear train defining a gear reduction ratio of greater than 2.3;
wherein a weight of the propulsor assembly is less than 40 percent of a total weight of the gas turbine engine, excluding any nacelle;
a first spool including a first shaft connecting a first compressor and the first turbine, the first shaft driving the propulsor through the gear train to drive the propulsor at a lower speed than the first spool, and the first compressor including three stages; and
a second spool including a second shaft connecting a second compressor and a second turbine, the second compressor including at least as many stages as the first compressor, the second turbine includes two stages, the first turbine including three turbine rotors, and wherein a weight of the propulsor is greater than a weight of the first turbine.

2. The gas turbine engine as recited in claim 1, wherein the gear reduction ratio is greater than 2.6.

3. The gas turbine engine as recited in claim 2, wherein the array has no more than 20 blades extending from the hub.

4. The gas turbine engine as recited in claim 3, wherein the second compressor includes a greater number of stages than the first compressor.

5. The gas turbine engine as recited in claim 4, further comprising a compressor section including the first compressor and the second compressor, wherein a axially forwardmost blade row of the compressor section is axially aft of the epicyclic gear train relative to an engine longitudinal axis.

6. The gas turbine engine as recited in claim 4, wherein the weight of the propulsor assembly is no more than 33.2 percent of the total weight of the gas turbine engine, excluding any nacelle.

7. The gas turbine engine as recited in claim 4, wherein the first compressor has a greater number of stages than the second turbine.

8. The gas turbine engine as recited in claim 7, wherein a ratio between a total number of the blades of the propulsor and a total number of turbine rotors of the first turbine is between 3.3 and 8.6.

9. The gas turbine engine as recited in claim 8, wherein the weight of the propulsor assembly is at least 28.4 percent of the total weight of the gas turbine engine, excluding the nacelle.

10. The gas turbine engine as recited in claim 9, wherein the epicyclic gear train is a star gear system.

11. The gas turbine engine as recited in claim 9, wherein the epicyclic gear train is a planetary gear system.

12. The gas turbine engine as recited in claim 9, wherein the gas turbine engine is a two-spool engine, the first spool is a low speed spool, and the second spool is a high speed spool.

13. The gas turbine engine as recited in claim 12, wherein the first turbine includes no more than six turbine rotors.

14. The gas turbine engine as recited in claim 13, wherein the first turbine includes an inlet, an outlet, and a pressure ratio greater than 5:1, wherein the pressure ratio is a ratio of a pressure measured prior to the inlet as related to a pressure at the outlet prior to any exhaust nozzle.

15. The gas turbine engine as recited in claim 14, further comprising a mid-turbine frame between the first turbine and the second turbine, wherein the mid-turbine frame supports a bearing system and includes a plurality of vanes that serve as inlet guide vanes for the first turbine.

16. The gas turbine engine as recited in claim 15, further comprising a compressor section including the first compressor and the second compressor, wherein a axially forwardmost blade row of the compressor section is axially aft of the epicyclic gear train relative to an engine longitudinal axis.

17. The gas turbine engine as recited in claim 14, wherein the first turbine has an equal or greater number of stages than the first compressor.

18. The gas turbine engine as recited in claim 17, further comprising a mid-turbine frame between the first turbine and the second turbine, wherein the mid-turbine frame supports a bearing system and includes a plurality of vanes that serve as inlet guide vanes for the first turbine.

19. The gas turbine engine as recited in claim 18, wherein the weight of the first turbine is at least 321 pounds.

20. The gas turbine engine as recited in claim 18, wherein the weight of the propulsor is at least 712 pounds.

21. The gas turbine engine as recited in claim 18, wherein the first turbine is a three-stage or four-stage turbine.

22. The gas turbine engine as recited in claim 21, wherein the weight of the propulsor assembly is 28.4 percent to 33.2 percent of the total weight of the gas turbine engine, excluding the nacelle.

23. The gas turbine engine as recited in claim 9, wherein the propulsor is a fan, and further comprising a bypass ratio of greater than 10 and a nacelle circumscribing the fan, wherein the propulsor assembly excludes the nacelle, and the total weight of the gas turbine engine excludes the nacelle.

24. The gas turbine engine as recited in claim 23, further comprising a low fan pressure ratio of less than 1.45 at cruise at 0.8 Mach and 35,000 feet, the fan pressure ratio measured across the blade alone.

25. The gas turbine engine as recited in claim 24, wherein the epicyclic gear train is a star gear system.

26. The gas turbine engine as recited in claim 24, wherein the epicyclic gear train is a planetary gear system.

27. The gas turbine engine as recited in claim 26, wherein the gas turbine engine is a two-spool engine, the first spool is a low speed spool, and the second spool is a high speed spool.

28. The gas turbine engine as recited in claim 27, wherein the weight of the propulsor assembly is 28.4 percent to 33.2 percent of the total weight of the gas turbine engine, excluding any nacelle.

29. The gas turbine engine as recited in claim 28, further comprising a mid-turbine frame between the first turbine and the second turbine, wherein the mid-turbine frame supports a bearing system and includes a plurality of vanes that serve as inlet guide vanes for the first turbine.

30. The gas turbine engine as recited in claim 29, wherein the first turbine includes no more than six turbine rotors.

* * * * *